US006843029B2

(12) United States Patent
Breitbach et al.

(10) Patent No.: US 6,843,029 B2
(45) Date of Patent: Jan. 18, 2005

(54) APPARATUS INCLUDING A BOOM TO BE COMPRESSED AND ROLLED UP

(75) Inventors: Elmar Breitbach, Göttingen (DE); Christoph Sickinger, Königslutter (DE); Lars Herbeck, Veltheim (DE)

(73) Assignee: Deutches Zentrum für Luft-und Raumfahrt e.V. (DE)

( * ) Notice: Subject to any disclaimer, the term of this patent is extended or adjusted under 35 U.S.C. 154(b) by 22 days.

(21) Appl. No.: 10/080,190

(22) Filed: Feb. 21, 2002

(65) Prior Publication Data

US 2002/0116877 A1 Aug. 29, 2002

(30) Foreign Application Priority Data

Feb. 28, 2001 (DE) .......................... 101 09 529

(51) Int. Cl.[7] .............................................. B64G 1/22
(52) U.S. Cl. .......................... 52/108; 52/111; 52/2.13
(58) Field of Search ...................... 52/2.21, 108, 111, 52/2.13

(56) References Cited

U.S. PATENT DOCUMENTS 3,367,604 A * 2/1968 Matteo ...................... 244/167
3,608,844 A * 9/1971 Tumulty et al. ............ 242/899
6,137,454 A 10/2000 Peck .......................... 343/912
6,508,036 B1 * 1/2003 Cadogan et al. ............. 52/2.13

FOREIGN PATENT DOCUMENTS

DE    198 25 785 C2   12/1999
EP       0524888 A1    1/1993

OTHER PUBLICATIONS

Seboldt, et al.; "Ground–Based Demonstration of Solar Sail Technology", pp. 2–4.

* cited by examiner

Primary Examiner—Carl D. Friedman
Assistant Examiner—Basil Katcheves
(74) Attorney, Agent, or Firm—Thomas, Kayden, Horstemeyer & Risley

(57) ABSTRACT

An apparatus includes at least one boom including a tip and a foot and being designed and arranged to be rolled up to form a roll. The tip is located in a radial inward region of the roll and the foot being located in a radial outward region of the roll. The apparatus further includes a unit being designed and arranged to unfold the at least one boom and including a bearing being designed and arranged to cooperate with the foot in a way that the boom in the region of the bearing at the beginning of the unfolding process has an enlarged cross section. Especially, the apparatus may be used in space technology for unfolding a solar sail.

3 Claims, 8 Drawing Sheets

APPARATUS INCLUDING A BOOM TO BE COMPRESSED AND ROLLED UP

CROSS REFERENCE TO RELATED APPLICATIONS

This application claims the benefit of co-pending German Patent Application No. 101 09 529.5-22 entitled "Vorrichtung mit einem im Querschnitt flach zusammengedrückten und der Länge nach aufgerollten Mast", filed on Feb. 28, 2001.

FIELD OF THE INVENTION

The present invention generally relates to the field of apparatuses including ultralight expandable booms. Such apparatuses include a boom the cross section of which may be compressed and which may be rolled up along its length. More particularly, the present invention relates to an apparatus including a lightweight boom to be rolled up to form a roll and to be connected to a solar sail or the like.

BACKGROUND OF THE INVENTION

Typically, the apparatuses include booms made of carbon fiber composite material. For example, such apparatuses are used in space technology, for example to span solar sails. It is desired that these apparatuses have a low mass or weight, respectively, and that they may be transported in a space-saving manner taking their comparatively great length of the unwound booms in space into account. Additionally, unrolling the booms has to be reliable, and the booms need to have maximum stiffness and to be located in a defined position with respect to the remainder of the apparatus in their unwound position.

An apparatus is known from "Solar Sail Technology Development And Demonstration" M. Leipold et al., Annual 2000, Deutsche Gesellschaft für Luft-und Raumfahrt (DGLR), Leipzig, Germany, September 2000. The known apparatus includes four booms having compressed cross sections and being rolled up on a common drum. The drum is arranged to be rotatable with respect to the remainder of the apparatus. The feet or basis of the booms are located on the drum in a radial inward direction of the drum close to its circumference, and the tips are located on the drum in a radial outward direction of the drum, meaning relatively far away from the outer circumference of the drum. The tips of the booms already have their expanded cross section even before unfolding the booms. The expanded cross section is stabilized by insert portions being located in the interior of the booms. To unwind the booms, guiding tapes are wound up from the drum, the guiding tapes being located between the separate booms. The booms are guided between the guiding tapes until they have reached their expanded cross section, meaning until they have sufficient stiffness. After having completely unwound the booms from the drum, the drum has to be fixed to allow for expansion of the cross section of the booms at their feet being connected to the drum. The entire mass of the known apparatus is comparatively great taking into account the mass of the drum on which the booms are wound up, the mass of the drives for pulling off the guiding tapes from the roll of booms, and the mass of the guiding tapes. Furthermore, it has to be taken into account that the technical expenditure for fixing the drum after having unfolded the booms and for expanding the cross section of the feet of the booms being connected to the drum is substantial.

SUMMARY OF THE INVENTION

The present invention relates to an apparatus including at least one boom including a tip and a foot and being designed and arranged to be rolled up to form a roll, the tip being located in a radial inward region of the roll and the foot being located in a radial outward region of the roll. The apparatus further includes a unit being designed and arranged to unfold the at least one boom and including a bearing being designed and arranged to cooperate with the foot in a way that the boom in the region of the bearing at the beginning of the unfolding process has an enlarged cross section.

The present invention also relates to an apparatus for unfolding a solar sail. The apparatus includes a least one boom including a tip and a foot and being designed and arranged to be rolled up to form a roll, the tip being located in a radial inward region of the roll and the foot being located in a radial outward region of the roll. A unit is designed and arranged to unfold the at least one boom, and it includes a bearing being designed and arranged to cooperate with the foot in a way that the foot at the beginning of the unfolding process has an enlarged cross section. At least one solar sail is operatively connected to the boom to be unwound together with the boom.

The present invention also relates to solar sail unit including a plurality of booms each including a tip and a foot and each being designed and arranged to be rolled up to form a separate roll, the tip being located in a radial inward region of the roll and the foot being located in a radial outward region of the roll. The solar sail unit includes a plurality of units each being designed and arranged to unfold one of the booms and each including a bearing being designed and arranged to cooperate with the foot in a way that the foot at the beginning of the unfolding process has an enlarged cross section. A solar sail includes a plurality of partial sails each being operatively connected to at least one of the booms to be unwound together with the boom.

The novel apparatus has a very small structural size, and it is very light at great functional safety.

The boom is to be understood as a longitudinal element such as a pole, a mast or the like. The foot of the boom is to be understood as one end of the boom, whereas the tip is to be understood as the other end of the boom. Typically, the tip of the boom has a cross section and/or a wall thickness which is less than the cross section and/or the wall thickness of the foot of the boom.

In the novel apparatus, the tip of the boom is not freely pushed towards the outside. Instead, the roll being formed by the boom is moved away from the remainder of the apparatus to unfold the boom. In this way, unfolding the boom substantially occurs in an automatic way due to restoring forces. These restoring forces act in the cross section of the boom, and they tend to re-expand the flattened cross section of the rolled up boom such that the boom is unrolled. This unrolling procedure begins at the foot of the boom at which the boom has an expanded cross section already at the beginning of the unfolding procedure. For example, unfolding the boom may be started by simply releasing the roll of the boom at a constantly expanded cross section at the foot of the boom. At a constantly expanded cross section at the foot of the boom, the foot of the boom may be easily supported in a bearing in a rigid and stationary way.

The roll or the winding of the boom does not need to be located on a drum. Then, the mass of the novel apparatus is further reduced. The inner rolling radius of the roll may be chosen to be very small since the tip of the boom is located in the inward portion of the roll. Typically, the tip of the boom has a cross section and/or a wall thickness which is less than the cross section and/or the wall thickness of the foot of the boom. In this way, it is possible to wind up the boom in the region of the tip at a comparatively small rolling diameter without damaging the boom. As a result, space requirements for the boom being wound up to form a roll are substantially reduced. In the case of a boom of which the cross section and/or the wall thickness diminishes towards the tip of the boom, forces causing the unfolding movement of the boom are increased at an increased cross section and/or an increased wall thickness at the foot of the boom in a way that they are sufficient to move the comparatively big and heavy roll. Correspondingly, forces prevailing at the tip of the boom and effecting the unrolling movement of the boom are less than at the foot of the boom, but they are sufficient since the remaining mass of the roll is also reduced. In this way, the novel way of rolling up the boom has further advantages. Consequently, complicated additional devices for unfolding the boom are not necessarily required in the novel apparatus. Usually, the boom is unfolded only one time, and it is not rolled up again.

Although special unfolding devices are not necessarily required in the novel apparatus since the restoring force of the boom is used for this purpose, it is, however, possible to further support the unfolding movement of the boom. For example, the bearing supporting the foot of the boom may be rotated about an axis being directed approximately perpendicular with respect to the boom in its unrolled position. In this way, centripetal forces being directed in a direction away from the bearing and acting upon the roll of the boom are also used to unfold the boom.

A source of compressed gas may be connectable to the interior of the boom to subject the interior of the boom with inner pressure further supporting the expanding movement of the boom from its flat compressed position to reach its expanded position.

Furthermore, an ejector unit for ejecting the roll in the longitudinal direction of the unrolled boom may be used to further facilitate unrolling the mass. For example, the ejector unit may be designed as a spring ejector or as a pyrotechnical ejector. Due to the outwardly directed acceleration of the roll and due to the fixed connection of the foot of the boom at the remainder of the apparatus, the unfolding movement of the boom from the roll is further improved.

To prevent an expanding movement of the roll in a radial direction away from its rolling axis, the apparatus may include a guiding unit to prevent this radial expanding movement. Preferably, the guiding unit is directly connected to the roll in a way that it is dislocated from the roll when the roll is dislocated from the remainder of the apparatus.

It is even possible to chose an arrangement in which the guiding unit is released from the boom in the unrolled position of the boom since the guiding unit is no longer required for the unfolded boom. A releasing unit may be located between the guiding unit and the tip of the boom to catapult the guiding unit away from the tip of the boom and from the remainder of the apparatus.

Another possible variation of designing a unit for unfolding the boom is a rotational drive being located between the guiding unit and the roll of the boom. Such a rotational drive may be designed to be supplied with energy by a mechanical spring similar to one known from clockworks. It is also possible to use a balance spring for controlling the unwinding process with respect to time.

The tip of the boom may be directly connected to a corner of a solar sail which is unfolded together with the boom. However, it is also possible to connect a deflection roller to the tip of the boom, and to unfold a solar sail with a rope being connected to the solar sail and being deflected by the deflection roller, for example.

Preferably, the novel apparatus includes a plurality of booms each being rolled up to form a roll. The arrangement of the rolls may be freely chosen due to the special design of the novel apparatus. It may be chosen in a way to minimize required space, or to adapt to existing usable free spaces. Especially, the arrangement of the rolls does not need to be rotationally symmetrical about a central axis of the arrangement corresponding to the number of rolls, as this is the case in prior art apparatuses in which a plurality of booms is rolled up on one common drum.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
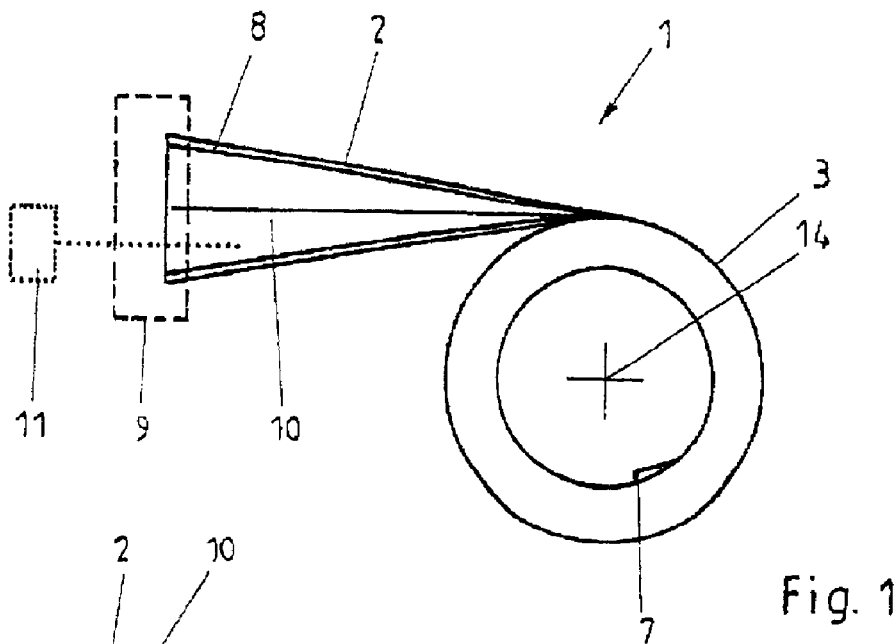
FIG. 1 is a view of a first exemplary embodiment of the novel apparatus including a boom being wound up to form a roll.

Referring now in greater detail to the drawings, FIG. 1 illustrates an apparatus 1 including a boom 2 (or a mast or a pole) being wound up over most of its length to form a roll 3. The boom 2 in its unrolled extended position and in a position in which it is free from forces has the cross section 4 as illustrated in FIG. 4. The boom 2 and its cross section 4, respectively, may be compressed to attain a flat cross section, the boom 2 then no longer being buckle-proof in a way that it may be wound up to form the roll 3. Especially, the boom 2 may be made of carbon fiber composite material 5, or at least the deformable wall 6 of the boom 2 may be made of carbon fiber composite material 5. The boom 2 has a very small mass and a very light weight, respectively, taking its unrolled length and its great stiffness in the unrolled position into account, as it corresponds to the cross section 4.

Figure 2:
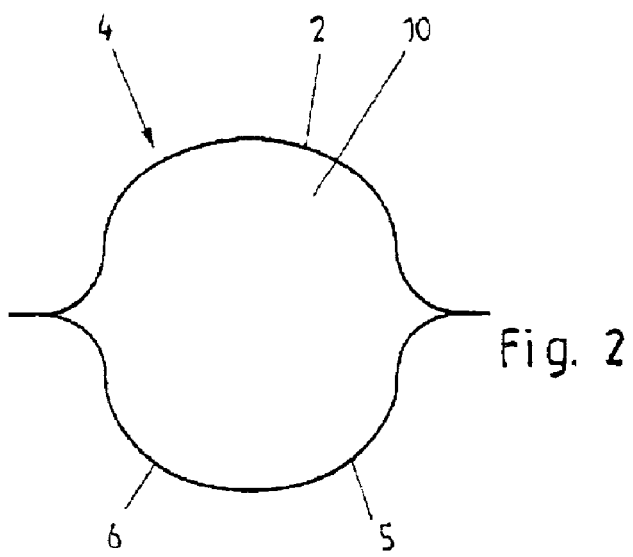
FIG. 2 is a view of the cross section of the expanded boom according to FIG. 1.

The novel apparatus 1 as illustrated in FIG. 1 includes the boom 2 being rolled up to form the roll 3 in a space-saving packed manner. The tip 7 of the boom 2 is located in the roll 3, and the boom 2 at the outer circumference of the roll 3 is connected to a foot or base 8. The foot 8 having the expanded cross section 4 according to FIG. 2 is supported in a bearing 9. Unrolling the boom 2 is already simplified by restoring forces of the flat compressed portion of the boom 2 which tends to re-expand. To actually initiate the unrolling process of the boom 2, the roll 3 is to be released in a way that it may move away from the bearing 9 supporting the foot 8 of the boom 2. During such a movement, the cross section of the wound up flat portion of the boom 2 expands, and the remaining roll 3 is further accelerated in a direction away from the bearing 9 and the foot 8 until the entire boom 2 has been unrolled from the roll 3.

Generally, the restoring forces of the cross section 4 of the boom 2 are sufficient to realize the desired unrolling movement. The restoring forces of the cross section 4 of the boom 2 together with the remaining mass of the roll 3 diminish as seen in a direction from the foot 8 towards the tip 7 of the boom 2. The remaining mass of the roll 3 diminishes due to the cross section 4 and/or the thickness of the wall 6 diminishing in this direction.

Figure 11:
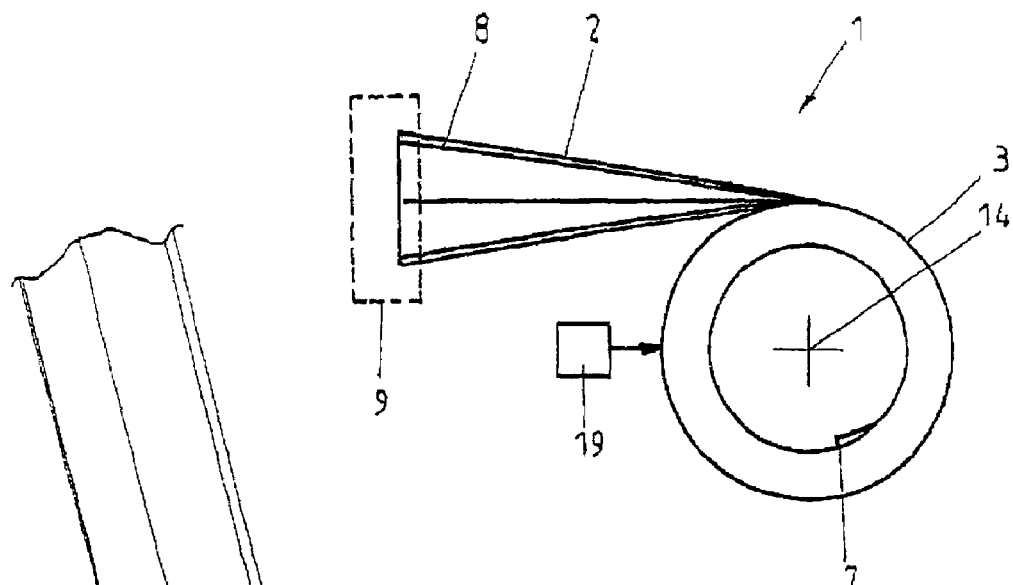
FIG. 11 is a view similar to FIG. 1, but schematically showing an ejecting unit.

However, it is also possible to take additional steps to further simplify unrolling of the boom 2 after having released the roll 3. For example, the procedure may be further simplified by using an ejector unit (FIG. 11) to release the roll 3 from contact with the bearing 9. Such an ejector unit may be designed as a spring ejector unit or also as a pyrotechnic ejector unit, for example. FIG. 1 schematically illustrates the further possibility of connecting the interior 10 of the boom 2 to a source of compressed gas 11 to attain a positive effect on the expanding movement of the flat compressed cross section of the boom 2 by subjecting the interior 10 with pressure.

Figure 3:
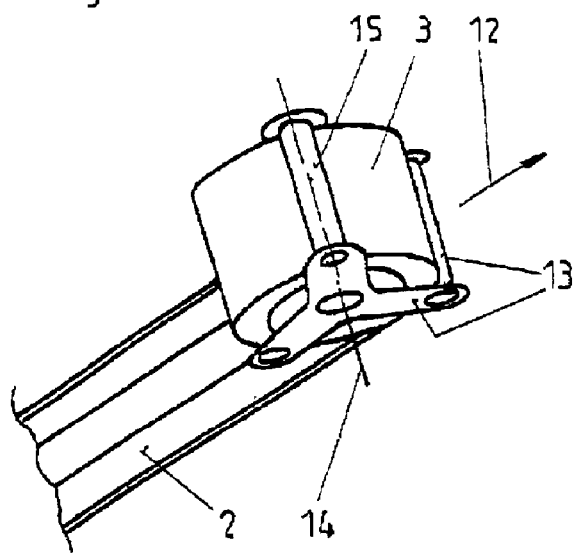
FIG. 3 is a view of the boom of FIG. 1 during unwinding and of the apparatus including an additional guiding unit for the roll.
Figure 4A:
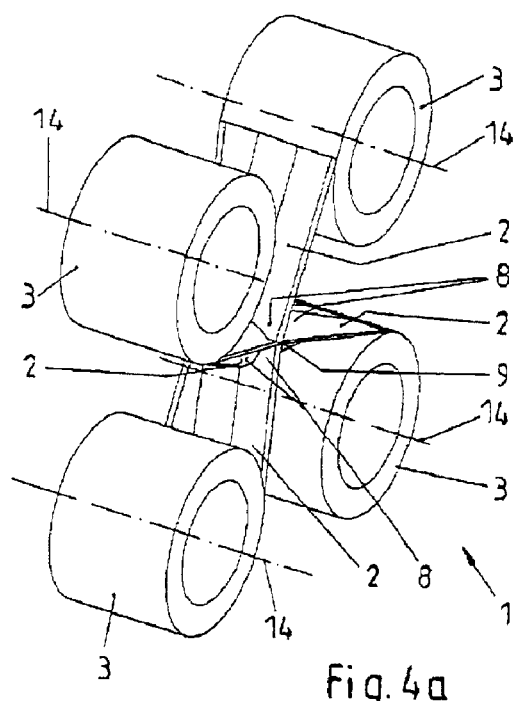
FIG. 4 is a view of an exemplary embodiment of the novel apparatus including four booms being wound up to form four rolls, FIGS. 4a–4d illustrating different perspectives.
Figure 4B:
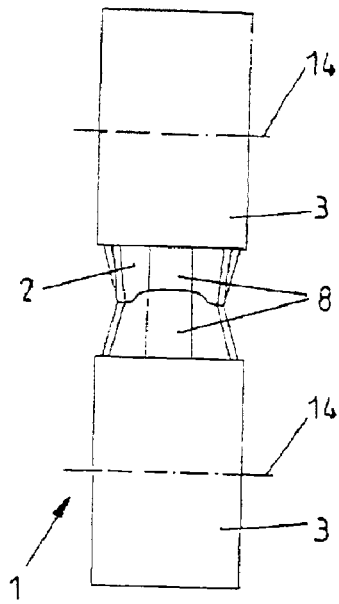
Figure 4C:
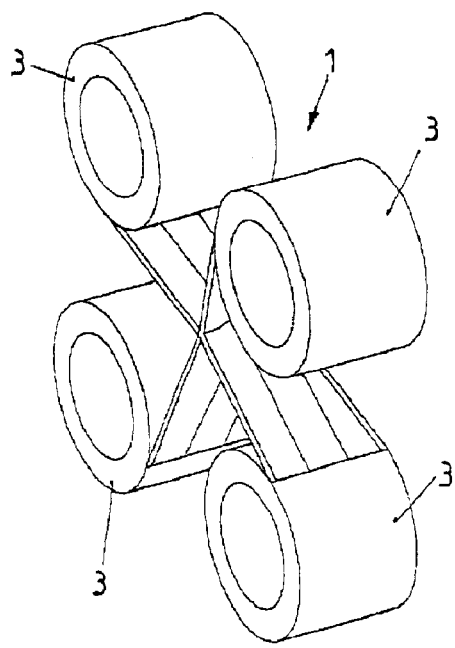
Figure 4D:
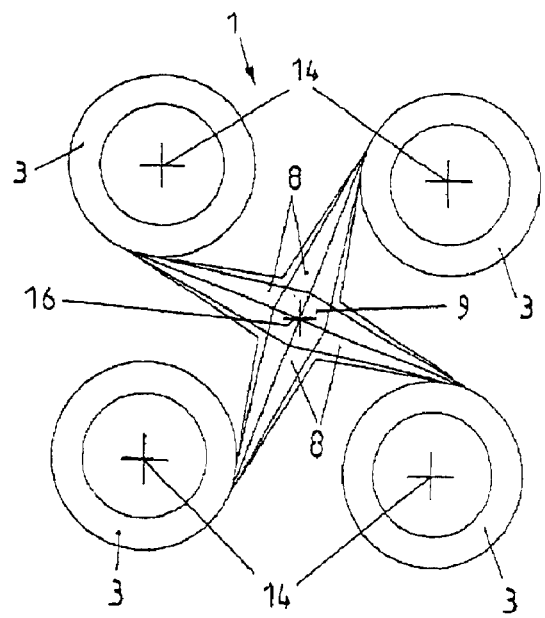
Figure 5A:
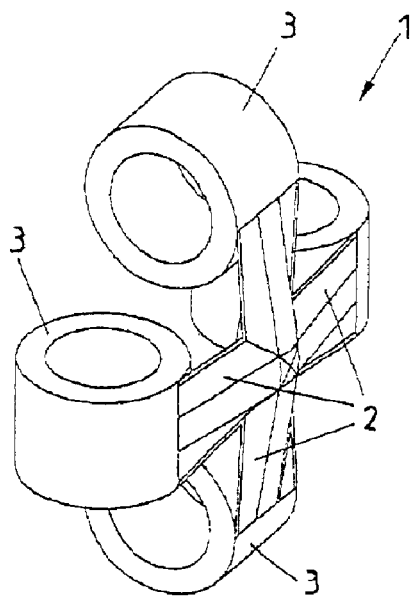
FIG. 5 is a view of another exemplary arrangement of four booms being wound up to form four rolls, FIGS. 5a–5d showing different perspectives.
Figure 5B:
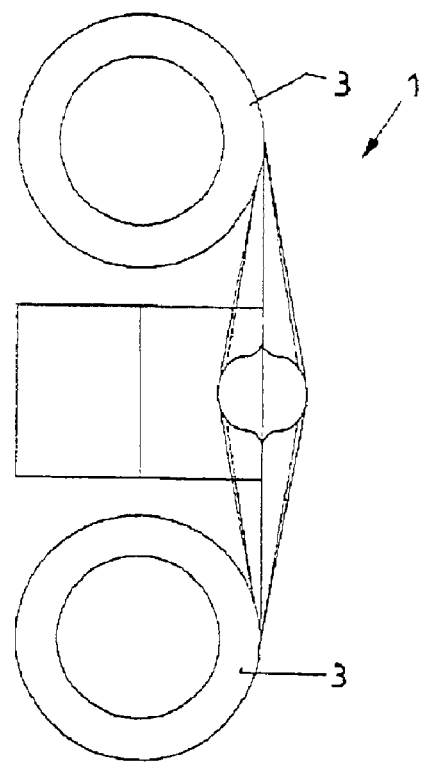
Figure 5C:
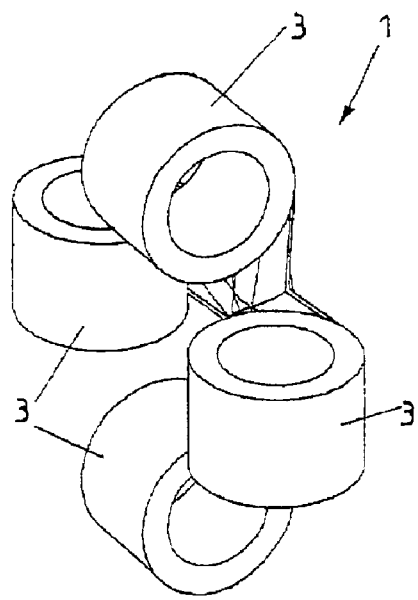
Figure 5D:
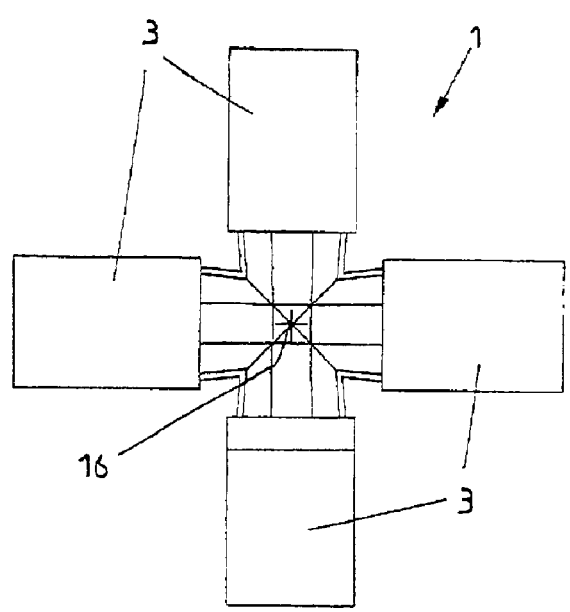
Figure 6A:
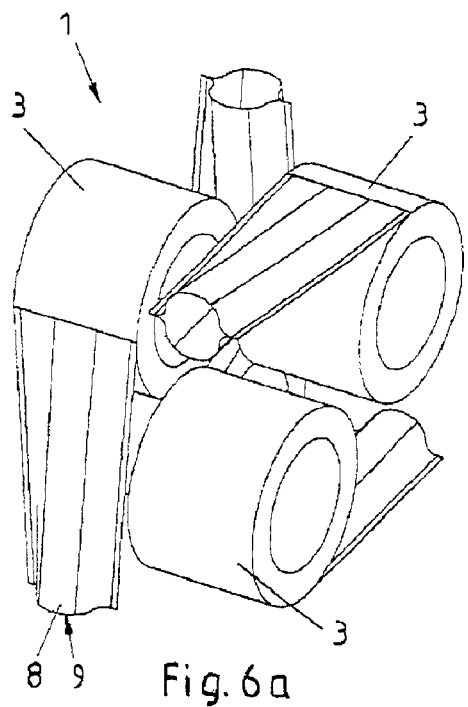
FIG. 6 is a view of another exemplary arrangement of four booms being wound up to form four rolls, FIGS. 6a–6d showing different perspectives.
Figure 6B:
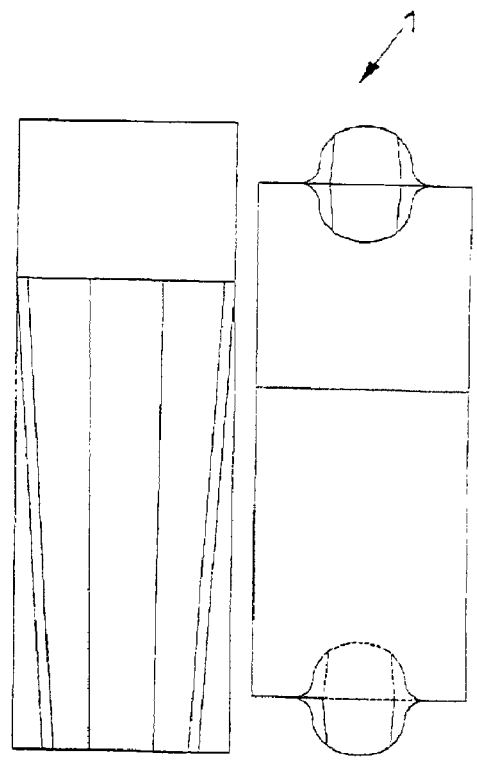
Figure 6C:
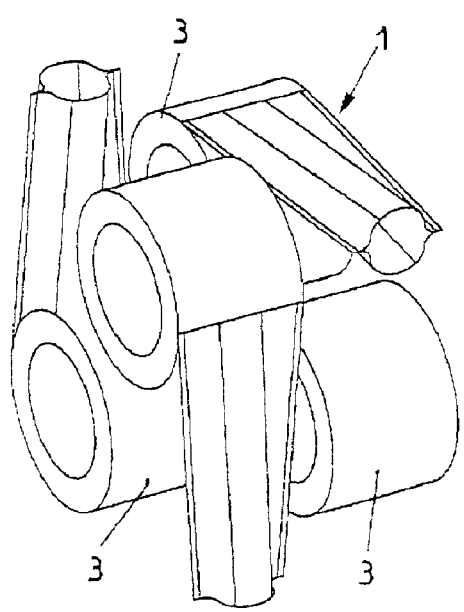
Figure 6D:
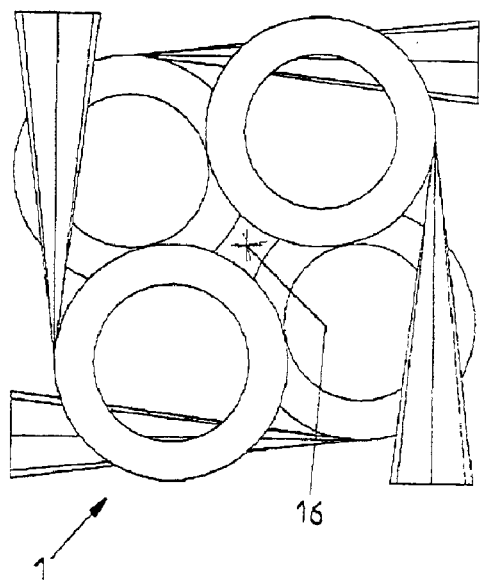
Figure 7A:
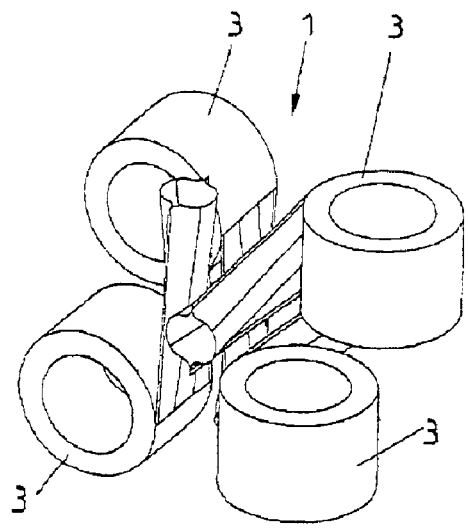
FIG. 7 is a view of another exemplary arrangement of four booms being wound up to form four rolls, FIGS. 7a–7d showing different perspectives.
Figure 7B:
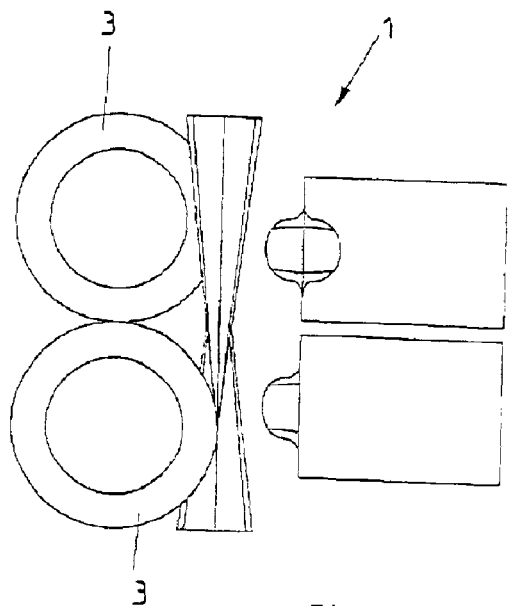
Figure 7C:
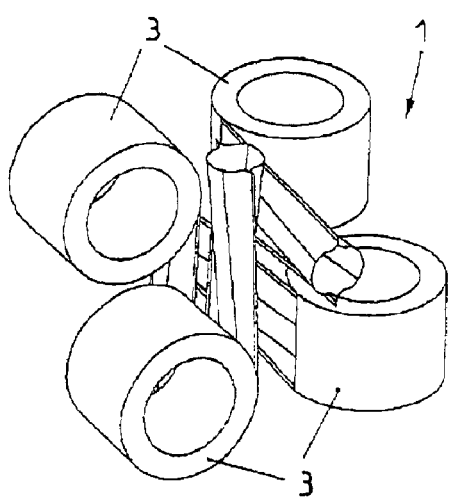
Figure 7D:
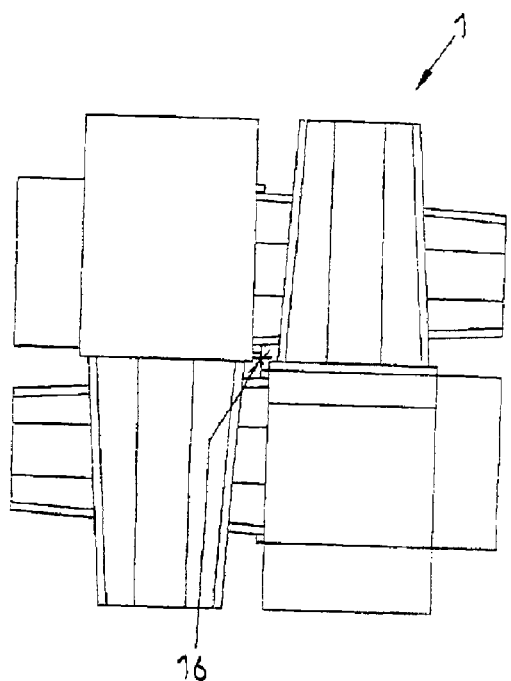

FIG. 3 illustrates the boom 2 during unwinding of the roll 3. The roll 3 moves in the direction of arrow 12. In addition to the details as described with respect to FIG. 1, the novel apparatus of FIG. 3 includes a guiding unit 13 being designed and arranged to prevent the roll 3 from expanding in a radial direction away from a winding axis 14 of the roll 3 due to restoring forces prevailing in the cross section of the boom 2. The guiding rollers 15 of the guiding unit 13 at least partly prevent an expanding movement of the roll 3 in a radial direction. It is also possible to use different unfolding units for the boom 2 being located between the guiding unit 13 and the roll 3. For example, a rotational drive (not illustrated) may have the design of a clockwork, and it may serve to unroll the boom 2 with respect to the guiding unit 13. Further exemplary embodiments of the guiding unit 13 will be described with respect to FIGS. 8–10.

The exemplary embodiment of the novel apparatus 1 as illustrated in FIG. 4 (FIGS. 4a–4d) includes four booms 2. The apparatus 1 is designed to be four times rotationally symmetric with respect to a central axis 16 extending through the bearing 9 supporting the feet 8 of the booms 2. The winding axes 14 of all four rolls 3 are arranged to be parallel with respect to one another.

The exemplary arrangement of four booms 2 being rolled up to form four rolls 3 as included in the apparatus 1 as to be seen in FIG. 5 differs from the embodiment of FIG. 4 with respect to the rolling axes 14 being located in one plane and only pairs of the rolling axes 14 being located to be parallel. In other words, the booms 2 of FIG. 5 have been rotated about their directions of main extension by 90° with respect to the bearing 9 as compared to their position in FIG. 4.

The arrangement of four booms 2 being wound up to form four rolls 3 according to FIG. 6 only shows double rotational symmetry about the center axis 16. The rolls 3 are arranged as pairs being displaced in the direction of the axis 16. The bearings 9 for the to feet 8 of the booms 2 are located in the four corners of the arrangement.

FIG. 7 illustrates another exemplary arrangement in which the four booms 2 being rolled up to form four rolls 3 are arranged in double rotational symmetry with respect to the central axis 16. The arrangement has been chosen such that the feet 8 of the booms 2 are arranged as opposing pairs, and such that the two opposing pairs of feet 8 are located in the middle region of the arrangement to be crosswise.

In each of the arrangements of FIGS. 4–7, centripetal forces may be caused to act upon the rolls 3 when rotating the arrangement about the central axis 16. These centripetal forces cause the rolls 3 to move away from the bearings 9 for the feet 8 of the booms 2 to simplify unfolding of the booms 2. One may chose the arrangement of the rolls 3 and of the bearings 9 in the novel apparatus 1 depending on the room available for mounting the novel apparatus 1. However, different arrangements than the ones which have been explained with respect to FIGS. 4–7 may also be chosen, and they are intended to be included within the scope of the present invention.

Figure 8:
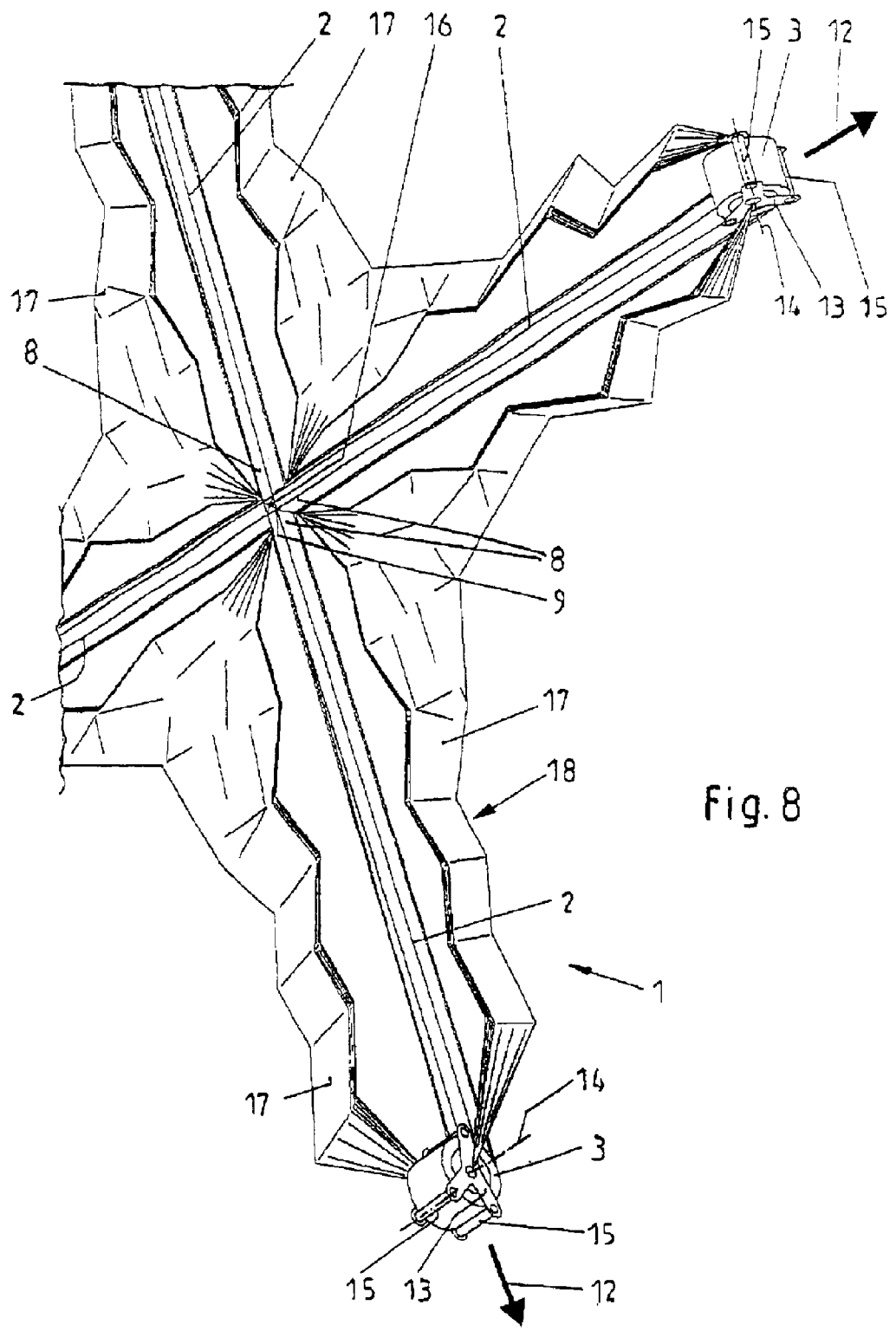
FIG. 8 is a view of an exemplary embodiment of the novel apparatus based on the arrangement of FIG. 5 during unfolding the booms and simultaneously unfolding a solar sail.

FIG. 8 illustrates another exemplary embodiment of the novel apparatus 1 using the arrangement of four booms 2 according to FIG. 5 and the guiding units 13 according to FIG. 3. The apparatus 1 serves to tenter a solar sail 18 as it is known in space technology. The solar sail 18 includes four partial sails 17. The partial sails 17 in the region of the bearings 9 for the feet 8 of the booms 2 are fixedly connected to two adjacent booms 2 by the guiding units 13 for the rolls 3. When the booms 2 are being unrolled by unrolling the rolls 3, the solar sail 18 is unfolded at the same time.

Figure 9:
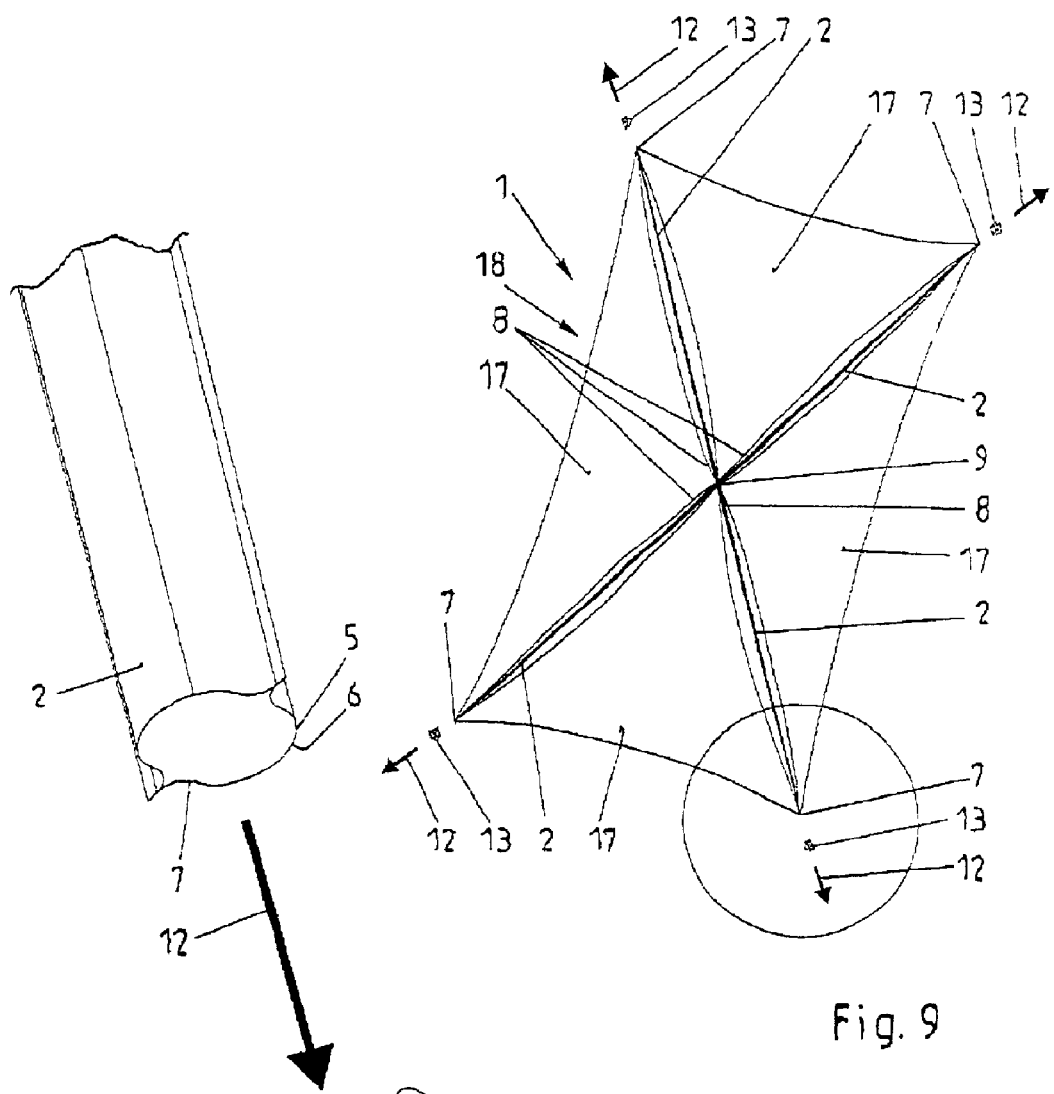
FIG. 9 is a view of the novel apparatus of FIG. 8 after unfolding the solar sail.

FIG. 9 and the enlarged detail according to FIG. 2 illustrate the solar sail 18 after unfolding in a modified exemplary embodiment of the novel apparatus 1 according to FIG. 8. In the illustrated case, each partial sail is not connected to the guiding unit 13 for the respective roll 3, but instead at the tip 7 of the respective boom 2. The guiding unit 13 gets free from the tip 7 of the unwound boom 2, and it moves further on in the direction of arrow 12 in a direction away from the bearings 9 for the feet 8 of the booms 2. This means that the guiding units 13 are detached because they are no longer required.

Figure 10:
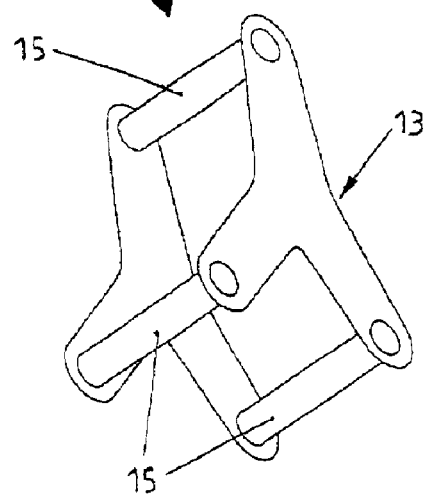
FIG. 10 is a view of an enlarged detail of FIG. 9 within the circle of FIG. 9.
Figure 12:
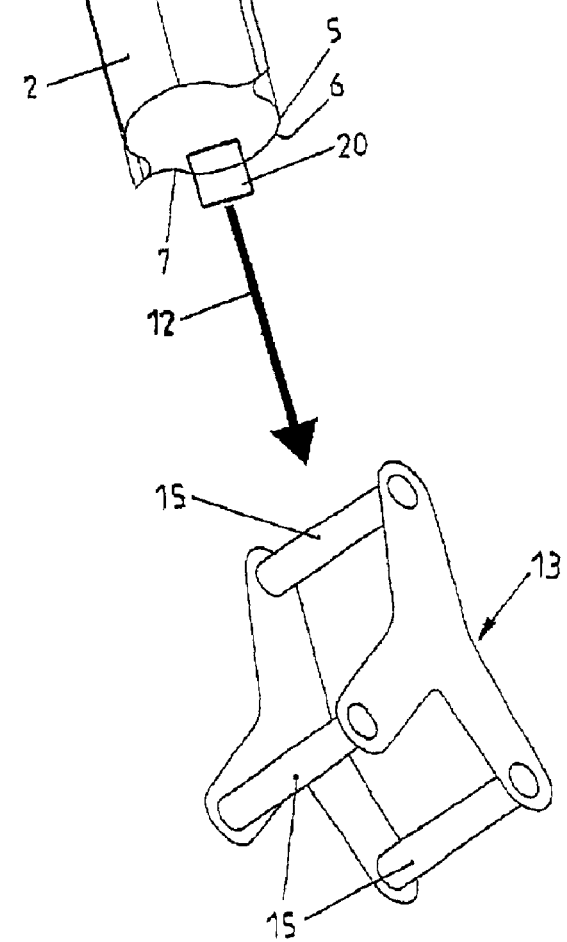
FIG. 12 is a similar view as FIG. 10, but additionally showing a release unit.

The detaching movement is illustrated in FIG. 10 at an enlarged scale. The connection of the partial sail 17 at the tip 7 of the illustrated boom 2 is omitted. Due to throwing off the guiding unit 13, the novel apparatus 1 at least after unfolding the boom 2 has an additionally reduced mass. In addition to inertia of the guiding unit 13, the force of a spring or the like of a release unit (FIG. 12) acting in the direction of arrow 12 may be used to throw off the guiding unit 13.

Many variations and modifications may be made to the preferred embodiments of the invention without departing substantially from the spirit and principles of the invention. All such modifications and variations are intended to be included herein within the scope of the present invention, as defined by the following claims.

We claim:

1. An apparatus comprising:

at least one boom including a tip and a foot and having an expanded cross-section when said at least one boom is free from external forces;

said at least one boom being designed and arranged to be compressed to attain a flat cross-section and to be rolled up with the flat cross-section to form a roll, said tip being located in a radial inward region of said roll and said foot being located in a radial outward region of said roll;

a unit being designed and arranged to unfold said at least one boom and including a bearing being designed and arranged to cooperate with said foot in a way that said boom in the region of said bearing at the beginning of the unfolding process has an enlarged cross-section; and a source of compressed gas, said boom including an interior being designed and arranged to be connected to said source of compressed gas, wherein said at least one boom is expanded by restoring forces that tend to re-expand the flat cross-section of said at least one boom in said roll to unroll the boom, and wherein said at least one boom is buckle-free and is stiff due to its expanded cross-section once it is unrolled.

2. An apparatus comprising:

at least one boom including a tip and a foot and having an expanded cross-section when said at least one boom is free from external forces;

said at least one boom being designed and arranged to be compressed to attain a flat cross-section and to be rolled up with the flat cross-section to form a roll, said tip being located in a radial inward region of said roll and said foot being located in a radial outward region of said roll;

a unit being designed and arranged to unfold said at least one boom and including a bearing being designed and arranged to cooperate with said foot in a way that said boom in the region of said bearing at the beginning of the unfolding process has an enlarged cross-section; and a source of compressed gas, said boom including an interior being designed and arranged to be connected to said source of compressed gas, wherein said at least one boom is expanded by restoring forces that tend to re-expand the flat cross-section of said at least one boom in said roll to unroll the boom, and wherein said at least one boom is buckle-free and is stiff due to its expanded cross-section once it is unrolled, and wherein said bearing is designed and arranged to be stationary.

3. An apparatus comprising:

at least one boom including a tip and a foot and being designed and arranged to be rolled up to form a roll, said tip being located in a radial inward region of said roll and said foot being located in a radial outward region of said roll;

a unit being designed and arranged to unfold said at least one boom and including a bearing being designed and arranged to cooperate with said foot in a way that said boom in the region of said bearing at the beginning of the unfolding process has an enlarged cross-section;

an axis being located to be approximately perpendicular with respect to said boom in its unrolled position, said bearing being designed and arranged to be rotatable about the axis; and a source of compressed gas, said boom including an interior being designed and arranged to be connected to said source of compressed gas.

* * * * *